(12) United States Patent
Namikawa

(10) Patent No.: US 9,460,876 B2
(45) Date of Patent: Oct. 4, 2016

(54) BREAKER, AND SAFETY CIRCUIT AND SECONDARY BATTERY CIRCUIT PROVIDED WITH THE SAME

(71) Applicant: KOMATSULITE MFG. CO., LTD., Suita-shi, Osaka (JP)

(72) Inventor: Masashi Namikawa, Suita (JP)

(73) Assignee: KOMATSULITE MFG. CO., LTD., Suita-Shi (JP)

( * ) Notice: Subject to any disclaimer, the term of this patent is extended or adjusted under 35 U.S.C. 154(b) by 219 days.

(21) Appl. No.: 14/364,882

(22) PCT Filed: Dec. 21, 2012

(86) PCT No.: PCT/JP2012/083211
§ 371 (c)(1),
(2) Date: Jun. 12, 2014

(87) PCT Pub. No.: WO2013/094725
PCT Pub. Date: Jun. 27, 2013

(65) Prior Publication Data
US 2014/0334055 A1 Nov. 13, 2014

(30) Foreign Application Priority Data
Dec. 22, 2011 (JP) .................................. 2011-281093

(51) Int. Cl.
*H01H 37/04* (2006.01)
*H01H 37/52* (2006.01)
(Continued)

(52) U.S. Cl.
CPC ............. *H01H 37/04* (2013.01); *H01H 37/52* (2013.01); *H01H 37/54* (2013.01);
(Continued)

(58) Field of Classification Search
CPC ...... H01H 37/04; H01H 37/54; H01H 37/52; H01H 2/348; H01H 2200/101; H01H 37/5427; H01H 61/01; H01H 61/04

USPC .......................... 337/36, 102, 112, 377, 380
See application file for complete search history.

(56) References Cited

U.S. PATENT DOCUMENTS 4,620,175 A * 10/1986 Karr .................. H01H 37/5427
337/343
4,862,133 A * 8/1989 Tabei .................... H01H 1/504
337/102

(Continued)

FOREIGN PATENT DOCUMENTS

CN            1744351 A      3/2006
JP       2006-149177 A       6/2006
(Continued)

OTHER PUBLICATIONS

JP 2011-134624—English Translation, Jul. 7, 2011.*
(Continued)

*Primary Examiner* — Anatoly Vortman
(74) *Attorney, Agent, or Firm* — Birch, Stewart, Kolasch & Birch, LLP

(57) ABSTRACT

A breaker is provided with: a movable piece (4) that has an elastically deformable elastic portion (43) and a movable contact on the tip of the elastic portion (43) and that presses the movable contact into contact with a fixed contact; a thermal actuator element (5) that is formed into a shape with a convex surface and is deformed by a change in temperature, thereby actuating the movable piece (4) so that the movable contact separates from the fixed contact; and a resin case (7) which houses the movable piece (4) and the thermal actuator element (5). The bottom surface of the base end (42a) of the movable piece (4) is positioned lower than the top (5a) of the upper surface of the thermal actuator element (5) by a distance (D). Thereby, a stable temperature adjustability and a resistance value are ensured in a breaker used as a protection device for a secondary battery with miniturization brought into realty.

6 Claims, 6 Drawing Sheets

(51) Int. Cl.
*H01H 37/54* (2006.01)
*H01H 61/01* (2006.01)
*H01H 61/04* (2006.01)
*H01M 2/34* (2006.01)

(52) U.S. Cl.
CPC ........ *H01H 37/5427* (2013.01); *H01H 61/01* (2013.01); *H01H 61/04* (2013.01); *H01M 2/348* (2013.01); *H01M 2200/101* (2013.01)

(56) References Cited

U.S. PATENT DOCUMENTS

| | | | | |
|---|---|---|---|---|
| 5,337,036 | A * | 8/1994 | Kuczynski | H01H 37/5427 337/343 |
| 5,607,610 | A * | 3/1997 | Furukawa | H01H 1/504 219/488 |
| 5,621,376 | A * | 4/1997 | Takeda | H01H 37/52 29/622 |
| 5,757,262 | A * | 5/1998 | Takeda | H01H 37/5418 337/333 |
| 5,804,798 | A * | 9/1998 | Takeda | H05B 1/0213 219/494 |
| 5,936,510 | A * | 8/1999 | Wehl | H01H 37/5418 337/100 |
| 6,335,113 | B1 * | 1/2002 | Nakatani | H01H 37/54 337/3 |
| 6,396,381 | B1 * | 5/2002 | Takeda | H01H 1/504 337/342 |
| 6,503,647 | B1 * | 1/2003 | Sugiyama | H01M 2/202 429/61 |
| 6,633,222 | B2 * | 10/2003 | Nagai | H01H 37/54 337/333 |
| 7,330,097 | B2 * | 2/2008 | Takeda | H01H 1/504 337/102 |
| 2001/0050609 | A1 * | 12/2001 | Takeda | H01H 37/5427 337/333 |
| 2002/0060898 | A1 * | 5/2002 | Nagai | H01H 37/54 361/634 |
| 2002/0140401 | A1 * | 10/2002 | Watanabe | H01M 2/22 320/134 |
| 2012/0032773 | A1 * | 2/2012 | Takeda | H01H 37/54 337/362 |
| 2014/0285308 | A1 * | 9/2014 | Namikawa | H01H 37/54 337/1 |
| 2014/0334055 | A1 * | 11/2014 | Namikawa | H01H 37/04 361/115 |

FOREIGN PATENT DOCUMENTS

| | | |
|---|---|---|
| JP | 2011-134624 A | 7/2011 |
| JP | 2011-198645 A | 10/2011 |
| WO | WO 2011/105175 A1 | 9/2011 |

OTHER PUBLICATIONS

International Search Report issued in PCT/JP2012/083211, dated Jan. 29, 2013.

* cited by examiner (a)

(b)

(c)

BREAKER, AND SAFETY CIRCUIT AND SECONDARY BATTERY CIRCUIT PROVIDED WITH THE SAME

BACKGROUND OF THE INVENTION

1. Technical field

The present invention relates to a minisize breaker built into a secondary battery pack for an electrical equipment and the like.

2. Background Art

Heretofore, a breaker is employed as a protection device (safety circuit) for a secondary battery, electric motor and the like in various electrical equipments (see FIG. 8 and FIG. 9). If an abnormal situation happens, for example, the temperature of the secondary battery is excessively increased during discharging or being charged, or an overcurrent flows in an electric motor or the like provided in an equipment, e.g. automobile, home electric appliance and the like, then the breaker shuts off the current to protect the secondary battery, electric motor and the like. Such breaker used as a protection device is, in order to ensure the safety of the equipment, required to exactly function in response to temperature change (to have good temperature property) and also required to have a stable resistance value in the conduction state.

When a breaker is used as a protection device for a secondary battery and the like provided in an electrical equipment such as a notebook-size personal computer, a tablet type handheld terminal and a thin-shaped multifunctional mobile-phone called "smartphone", miniaturization is required in addition to the above-mentioned ensuring of the safety of the equipment. In the case of the recent handheld terminals, in particular, the users' preferences toward miniaturization (thin-shaped) are strong. Equipments newly launched on the market by various manufacturers have a strong tendency to have miniaturized designs in order to obtain superiority in the design. Under such circumstances, a breaker—mounted together with a secondary battery, as one of component parts of a handheld terminal—is also strongly required to be further miniaturized.

The breaker is provided with a thermal actuator element operating in response to temperature changes so as to pass or shut off an electric current. In Patent document 1, a breaker in which a bimetal is used as a thermal actuator element is disclosed. A bimetal is formed by laminating two kinds of platy metal materials having different coefficients of thermal expansion. The bimetal is an element which changes its shape in response to temperature changes and controls conduction/nonconduction states of the contacts. The breaker disclosed in the document is composed of parts which are a fixed piece (base terminal), a movable piece (movable arm), a thermal actuator element, a PTC thermistor and the like and which are put in a resin casing. In order to use, the terminals of the fixed piece and the movable piece are connected to an electrical circuit of an electrical equipment.

PRIOR ART DOCUMENT

Patent Document

Patent document 1 wo2011/105175

DISCLOSURE OF INVENTION

Problems that the Invention is Going to Solve

In a breaker disclosed in Patent Document 1 as mentioned above, thickness of a resin casing in a region including a base end portion (fixed part 33 in the same Patent Document) of a movable piece and small protrusions (reference numeral 38 in the same Patent Document) in the vicinity thereof becomes a hurdle, which is one of factors that prevent further miniaturization of the breaker. This is because a fixed part needs to be firmly fixed on both front and back surfaces by the resin casing and because an internal space sufficient to accommodate the small protrusions and a thermal actuator element in the vicinity thereof is needed.

The present invention has been made in light of the problems described above and an objective of the present invention is to provide a breaker which can achieve miniaturization, while ensuring stable temperature followability and a resistance value.

Means to Solve the Problems

To achieve the above object, the present invention provides a breaker comprising: a fixed piece having a fixed contact, a movable piece having an elastically deformable elastic portion and a movable contact in a tip section of the elastic portion, for pressing the movable contact to the fixed contact so as to contact therewith, a thermal actuator element for actuating the movable piece so that the movable contact is separated from the fixed contact by its deformation accompanying a temperature change, and a casing for housing the fixed piece, the movable piece and the thermal actuator element, the breaker is characterized in that a bottom surface of a base end portion of the movable piece is positioned lower than a top of an upper surface of the thermal actuator element while the fixed contact is in contact with the movable contact.

Effects of the Invention

With a breaker of the present invention, since a bottom surface of a base end portion of an elastic portion is positioned lower than a top of an upper surface of a thermal actuator element, overall thickness of a casing can be made thinner while setting thickness of a part higher than the base end portion of the elastic portion similar to a conventional breaker, which can thus achieve further reduction in thickness of the breaker.

MODE FOR CARRYING OUT THE INVENTION

Figure 1:
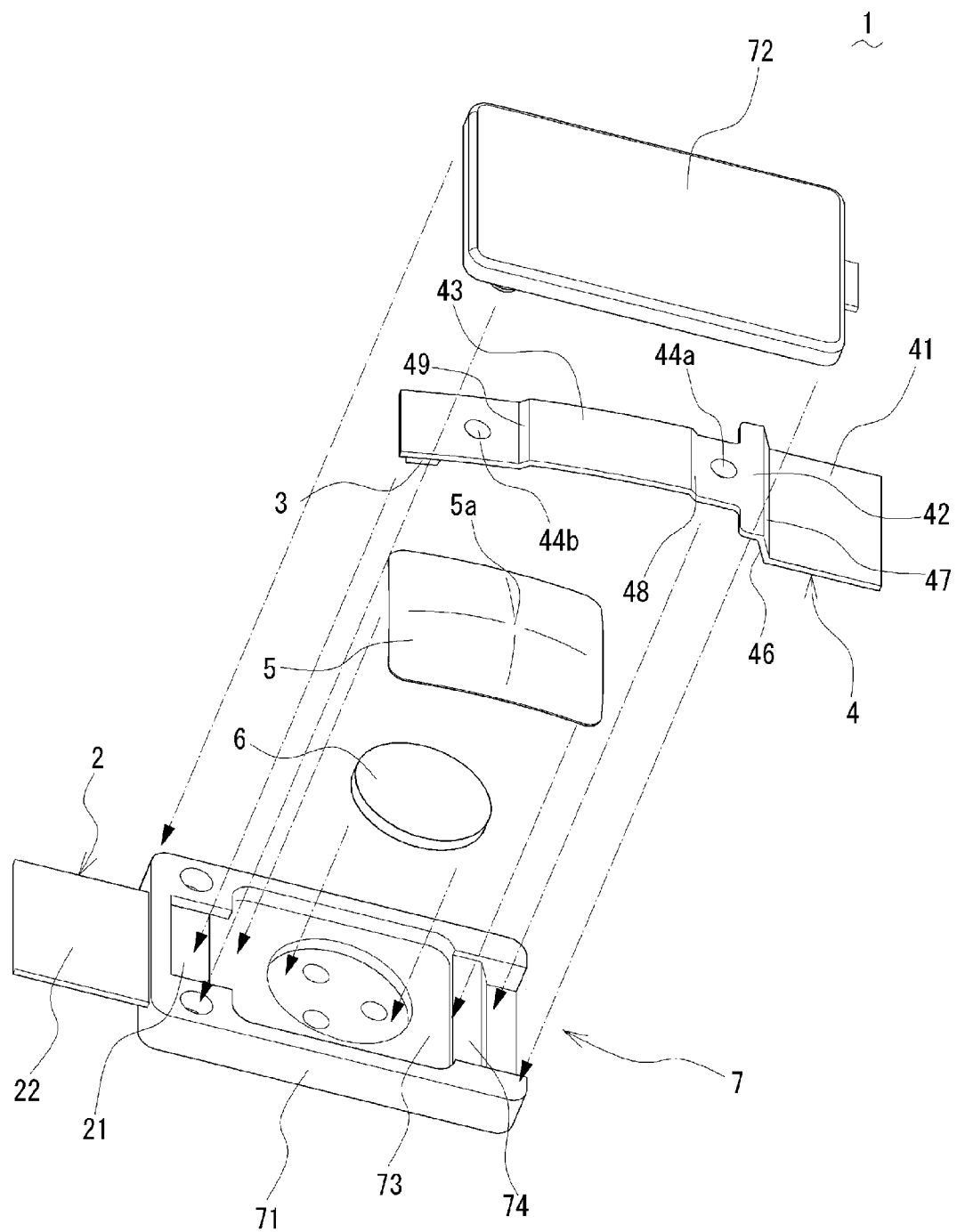
FIG. 1 is a perspective assembling drawing showing a structure of a breaker according to the present invention.
Figure 2:
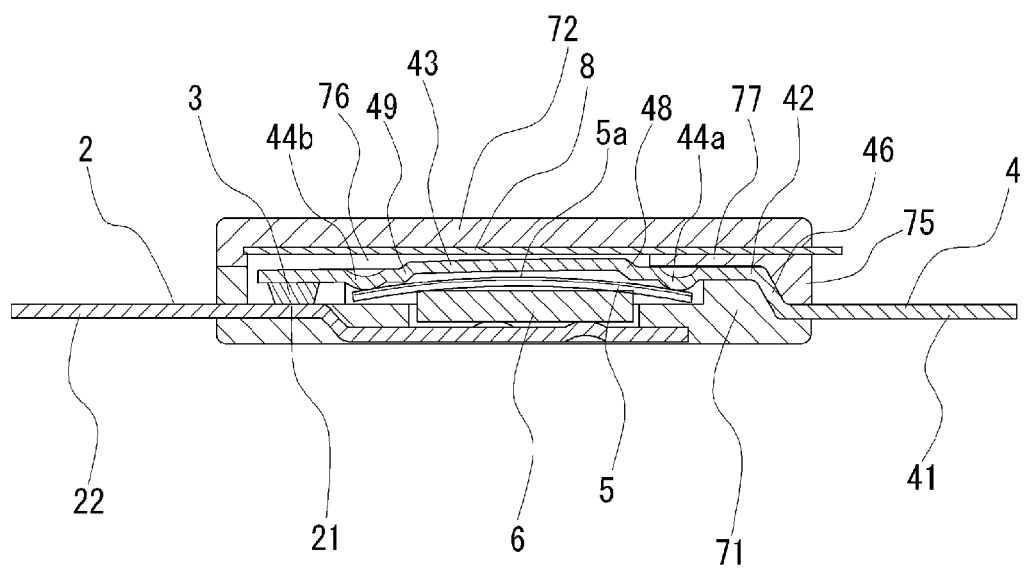
FIG. 2 is a cross sectional view showing the breaker in a usual operating state of charge or discharge.
Figure 3:
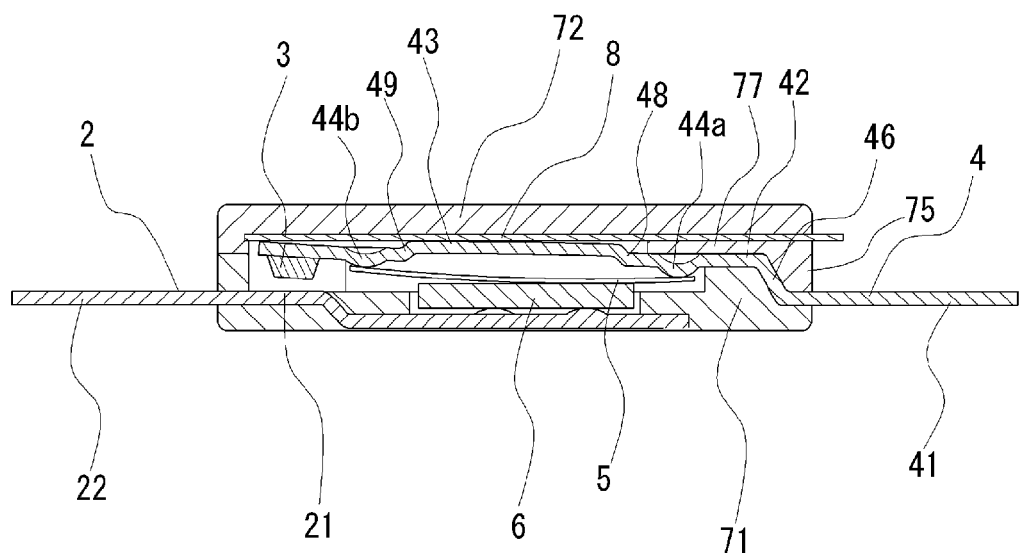
FIG. 3 is a cross sectional view showing the breaker in a state of overcharge or abnormal state.

A breaker according to an embodiment of the present invention will now be described in reference to the drawings. FIGS. 1-3 show the structure of the breaker.

The breaker 1 is constructed by
a fixed piece 2 having a fixed contact 21,
a movable piece 4 having a movable contact 3 in the tip section,
a thermal actuator element 5 deformable in response to a temperature change,
a PTC (Positive Temperature coefficient) thermistor 6, and a resin casing 7 for housing the fixed piece 2, the movable piece 4, the thermal actuator element 5 and the PTC thermistor 6 and the like.

The resin casing 7 is composed of a resin base (first casing) 71, a covering member (second casing) 72 mounted on the upper surface of the resin base 71 and the like. Note that in this application, an upper direction in FIG. 1 to FIG. 3, specifically, a direction in which the PTC thermistor 6, the thermal actuator element 5, and the movable piece 4 are sequentially stacked is described as the upper direction of the breaker 1. The above-mentioned direction may be replaced as appropriate, depending on posture of incorporating the breaker 1 into a secondary battery and the like and further on posture of mounting the secondary battery and the like onto electrical equipment.

From a metal sheet composed mostly of phosphor bronze (also, a metal sheet of a copper-titanium alloy, nickel silver, brass or the like), the fixed piece 2 is formed through press working, and embedded in the resin base 71 through insert molding. A terminal 22 for being electrically connected to the outside is formed at one end of the fixed piece 2. Near the other end, the PTC thermistor 6 is placed thereon. The PTC thermistor 6 is placed on small protrusions formed at three positions near the other end of the fixed piece 2. The fixed contact 21 is formed at a position facing the movable contact 3 by clading, plating or applying a material having a good electrical conductivity, e.g. silver, nickel, a nickel-silver alloy, a copper-silver alloy, a gold-silver alloy and the like. The fixed contact 21 is exposed through one part of an opening 73b formed on the upper side of the resin base 71. The terminal 22 is protruded to the outside penetrating through one end of the resin base 71.

The movable piece 4 is formed, in a form of an arm symmetrical about its longitudinal center line, from a sheet of a metal material through press working. At one end of the movable piece 4 in its longitudinal direction, a terminal 41 which is electrically connected to an outside circuit, is formed so as to be protruded to the outside penetrating through the resin base 71. In this embodiment, the movable piece 4 is bent like a crank in a first stepped bent part 46 in the resin casing 7 in order to align height of the terminal 22 of the fixed piece 2 with height of the terminal 41 of the movable piece 4. At the other end of the movable piece 4 (corresponding to the tip end of the movable piece 4 as an arm), the movable contact 3 is formed. The movable contact 3 is made of a material similarly to the fixed contact 21 and joined with the tip section of the movable piece 4 through a technique of welding, crimping or the like. The movable piece 4 is provided between the movable contact 3 and the terminal 41 with a fixed part 42 and an elastic portion 43.

In the specification, of regions sandwiched by an arm support surface 74 of the resin base 71 and a pressing part 77 of the covering member 72, a region on the side of the elastic portion 43, rather than the first stepped bent part 46, is made the fixed part 42. Since the fixed part 42 is fixed by being sandwiched by the arm support surface 74 and the pressing part 77, actually, it cannot be deformed elastically. Then, a base end of the elastic portion 43, specifically, a boundary member between elastically undeformable fixed part 42 and the elastically deformable elastic portion 43 is made a base end portion 42a (see FIG. 4). The movable piece 4 is fixed, in the fixed part 42, by being sandwiched between the resin base 71 and the covering member 72 from the rear surface side and the front surface side. The elastic portion 43 is elastically deformed and the movable contact 3 formed at the tip end is forced toward the fixed contact 21 to contact therewith. Thus, electricity can flow through between the fixed piece 2 and the movable piece 4.

In addition, the movable piece 4 has the first stepped bent part 46 formed between the terminal 41 and the fixed part 42, and a second stepped bent part 48 and a third stepped bent part 49 which are formed in the elastic portion 43. The second stepped bent part 48 is set up between a center part of the elastic portion 43 opposed to the vicinity of the top 5a of the upper surface of the thermal actuator element 5 and the base end portion 42a on the side of the fixed part 42, arranging the elastic portion 43 and the base end portion 42a in a staggered manner. With this, the upper surface of the fixed part 42 (base end portion 42a), which contacts with and is pressed by the pressing part 77 of the covering member 72, is positioned lower than the topmost part of the elastic portion 43. In addition, the third stepped bent part 49 is set up between the center part of the elastic portion 43 opposed to the vicinity of the top 5a of the thermal actuator element 5 and the tip section where the movable contact 3 is provided, arranging the tip section where the movable contact 3 is provided lower than the center part of the elastic portion 43 of the movable piece 4.

In addition, a pair of protrusions 44a and 44b is formed opposed to the thermal actuator element 5 on the bottom surface of the elastic portion 43. The protrusions 44a and 44b make contacts with the thermal actuator element 5 at two positions, and reverse curving deformation of the thermal actuator element 5 is transmitted to the elastic portion 43 by way of the protrusions 44a and 44b (see FIG. 2 and FIG. 3). The protrusions 44a and 44b are not essential and either or both of them may be omitted. Preferably, the movable piece 4 is made of a material composed mostly of phosphor bronze. In addition to this, an electrically-conducting elastic material such as a copper-titanium alloy, nickel silver, brass and the like may be used for the movable piece 4.

As shown in FIG. 2, the thermal actuator element 5 has a spherically or aspherically curved initial shape so that the center part in the same figure protrudes upward, and is made of a composite material such as bimetal, tri-metal and the like. As shown in FIG. 3, when the thermal actuator element 5 reaches an operating temperature by overheating, a curved shape of the thermal actuator element 5 is reversely curved accompanied with a snap motion, and restored when it falls below the return temperature by cooling. The thermal actuator element 5 has the top 5a on the upper surface side in the initial shape as described above and can be formed by press working. The material and shape of the thermal actuator element 5 are not particularly limited as far as the elastic portion 43 of the movable piece 4 is pressed up, at the desired temperature, by the reversely curving motion of the thermal actuator element 5, and it is restored to the original by the elastic force of the elastic portion 43. But, from a point of view of the production efficiency and the efficiency of the reversely curving motion, a rectangle is desirable. In order to effectively press up the elastic portion 43 though a small size, a rectangle close to a square is desirable. As to the material of the thermal actuator element 5, a laminate of two kinds of materials having different coefficients of thermal expansion is used. Various alloys, for example, a copper-nickel-manganese alloy and a nickel-chromium-iron alloy used on the high expansion side, and an iron-nickel alloy, a nickel silver, a brass, a stainless steel used on the low expansion side are used in combination according to the requirements.

If the conduction between the fixed piece 2 and the movable piece 4 is broken by the reversely curving motion of thermal actuator element 5, then an electric current flowing through the PTC thermistor 6 is increased. As to the PTC thermistor 6, as far as it is a positive temperature coefficient thermistor whose resistance value is increased with increase in the temperature and which restrict the flow of electrical current, its type can be selected according to requirements such as the operating current, operating voltage, operating temperature and return temperature, and its shape is not limited as far as these characteristics are not impaired.

The resin base 71 and the covering member 72, which constitute the resin casing 7, are molded from resin such as burn-resistant polyamide, heat-resistant polyphenylene sulfide (PPs), liquid crystalline polymer (LCP) and polybutylene terephthalate (PBT). The resin base 71 is provided with a opening 73 for housing the fixed piece 2, the movable piece 4, the thermal actuator element 5 and the PTC thermistor 6. The edges of the thermal actuator element 5 and the PTC thermistor 6, which are mounted in the resin base 71, are contacted by rims formed in the accommodation part 73 and guided when the thermal actuator element 5 is reversely curved.

The covering member 72 has a stepped part 75 protruding from an inner wall surface thereof into a shape corresponding to an inclined plane 47 of the movable piece 4, an opening 76 corresponding to the opening 73, and the pressing part 77 contacting with the upper surface of the fixed part 42 of the movable piece 4 and pressing down the movable piece 4.

A covering piece 8 is embedded in the covering member 72 by means of insert molding. The covering piece 8 is formed by press working from the above-mentioned metal sheet composed mostly of phosphor bronze, a metal sheet of stainless steel or the like. As shown in FIG. 2 and FIG. 3, the covering piece 8 contacts with the upper surface of the movable piece 4 to control the motion of the movable piece 4, and also increases the stiffness and strength of the covering member 72 and accordingly those of the resin casing 7.

As shown in FIG. 1, the covering member 72 is mounted on the upper surface of the resin base 71 so as to close the accommodation part 73 of the resin base 71 housing the fixed piece 2, the movable piece 4, the thermal actuator element 5 and the PTC thermistor 6. The resin base 71 and the covering member 72 are joined together for example by means of ultrasonic welding.

FIG. 2 shows the behavior of the breaker 1 in its normal state of charge or discharge. In the normal state of charge or discharge, the thermal actuator element 5 keeps the initial shape (before reversely curved), and the fixed contact 21 and the movable contact 3 contact with each other, therefore the breaker 1 is conductive between the both of the terminals 22 and 41 through the elastic portion 43 of the movable piece 4 etc. The elastic portion 43 of the movable piece 4 contacts with the thermal actuator element 5. The movable piece 4, the thermal actuator element 5, the PTC thermistor 6 and the fixed piece 2 are conductive as a circuit. But, the resistance of the PTC thermistor 6 is very high when compared with the resistance of the movable piece 4, therefore, the electric current flowing through the PTC thermistor 6 is practically negligibly-small when compared with that flowing through the fixed contact 21 and the movable contact 3.

FIG. 3 shows the behavior of the breaker 1 in a state of overcharge or abnormal condition. When becoming in a high-temperature state by overcharging or abnormality, the PTC thermistor 6 is overheated, and the thermal actuator element 5 reaching to the operating temperature is reversely curved, and the elastic portion 43 of the movable piece 4 is pushed up, and the movable contact 3 is separated from the fixed contact 21. The electric current flowing between the fixed contact 21 and the movable contact 3 at the time is interrupted, and a very small leak current flows through the thermal actuator element 5 and the PTC thermistor 6. In so far as such leak current flows, the PTC thermistor 6 generates heat and keeps the reversely curved state of the thermal actuator element 5 which greatly increases the resistance value. Therefore, no current flows between the fixed contact 21 and the movable contact 3, and only the above-mentioned small leak current flows (self-holding circuit is formed). The leak current may be used for another function of a safety system.

By eliminating the overcharging state or resolving the abnormal state, the heat generation of the PTC thermistor 6 is stopped, and the thermal actuator element 5 becomes the return temperature and restores its initial shape. Then, due to the elastic force of the elastic portion 43 of the movable piece 4, the movable contact 3 again contacts with the fixed contact 21 to end the cut-off state of the circuit and return to the conduction state shown in FIG. 2.

Figure 4:
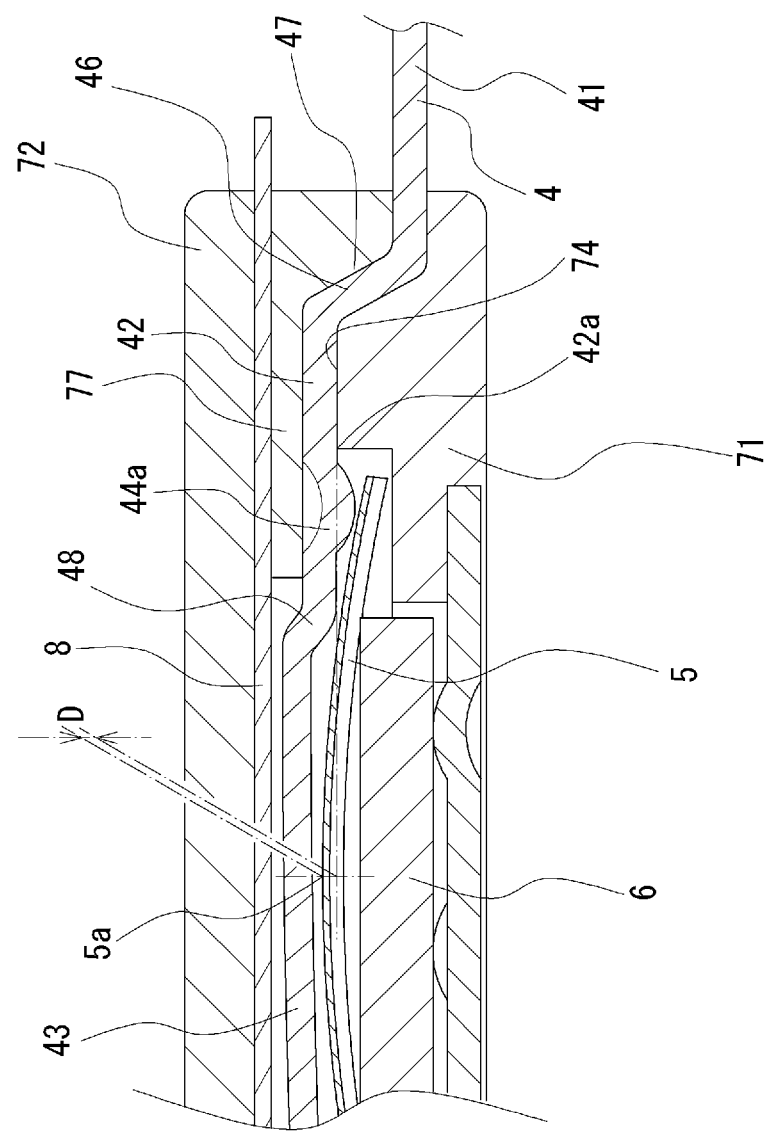
FIG. 4 is an enlarged cross sectional view showing the vicinity of the top of a thermal actuator element, the base end portion of a movable piece.

FIG. 4 is an enlarged view showing the vicinity of the top 5a of the thermal actuator element 5, the fixed part 42 of the movable piece 4, and the base end portion 42a. The bottom surface of the fixed part 42 of the movable piece 4 is placed on the arm support surface 74 of the resin base 71 (See FIG. 1), and set up in parallel to a sole of the resin base 71. A member contacting with an edge of the arm support surface 74 is made the base end portion 42a of the elastic portion 43. In this case, the base end portion 42a may be a root of the elastic portion 43 protruding in an almost parallel direction from the edge of the arm support surface 74 when it is viewed from inside of the opening 73. Since the arm support surface 74 is formed on a flat plane parallel to a sole of the resin base 71, the bottom surface of the base end portion 42a is at the level similar to the bottom surface of the fixed part 42, from the sole of the resin base 71. In addition, since a basic shape (shape excluding the protrusion 44a) of the movable piece 4 is formed like a flat plane from the fixed part 42 to the vicinity of the second stepped bent part 48, height of the bottom surface of the movable piece 4 from the fixed part 42 to the vicinity of the second stepped bent part 48 is uniform.

In the elastic portion 43 of the movable piece 4, the second stepped bent part 48 is formed in the vicinity of the base end portion 42a, and the second stepped bent part 48 withdraws the center part of the elastic portion 43 upward. The center part of the thermal actuator element 5 is housed in a space generated by the second stepped bent part 48 withdrawing the center part of the elastic portion 43.

The thermal actuator element 5 is formed by being curved so that the thermal actuator element 5 at the top of the upper surface thereof is positioned higher than the bottom surface of the base end portion 42a by a distance D in the figure (D is a positive number). Specifically, the bottom surface of the base end portion 42a of the movable piece 4 is formed lower than the top 5a of the upper surface of the thermal actuator element 5 by the distance D. The distance D is determined as appropriate, depending on a curvature of the thermal actuator element 5, an amount of protrusion of the protrusion 44a, overall thickness of the resin casing, and the like.

In addition, the pressing part 77 which contacts with the fixed part 42 and the upper surface of the base end portion 42a and presses down the movable piece 4 is formed in the covering member 72. In the embodiment, while the pressing part 77 is formed at a position overlapping the protrusion 44a in a planar view, it is acceptable if the pressing part 77 is formed at a position or in its vicinity that overlaps, in a planar view, a member with which the thermal actuator element 5 and the movable piece 4 contact on the edge of the thermal actuator element 5 at the pressing part 77 side, when the thermal actuator element 5 is reversely curved and deformed.

Figure 5:
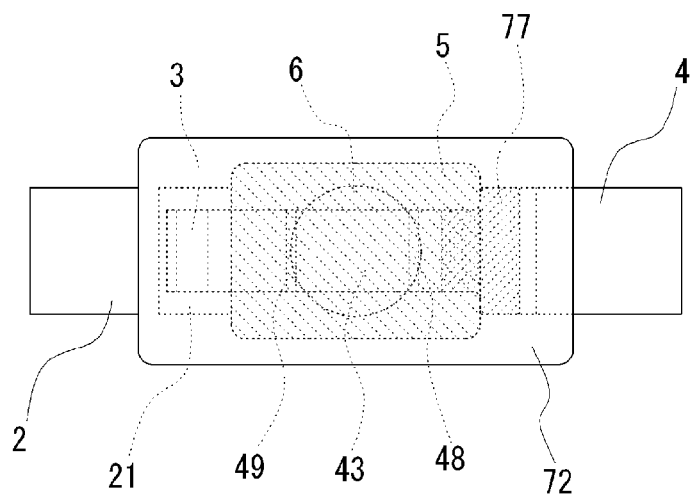
FIG. 5 is a plan view showing the same breaker.
Figure 6:
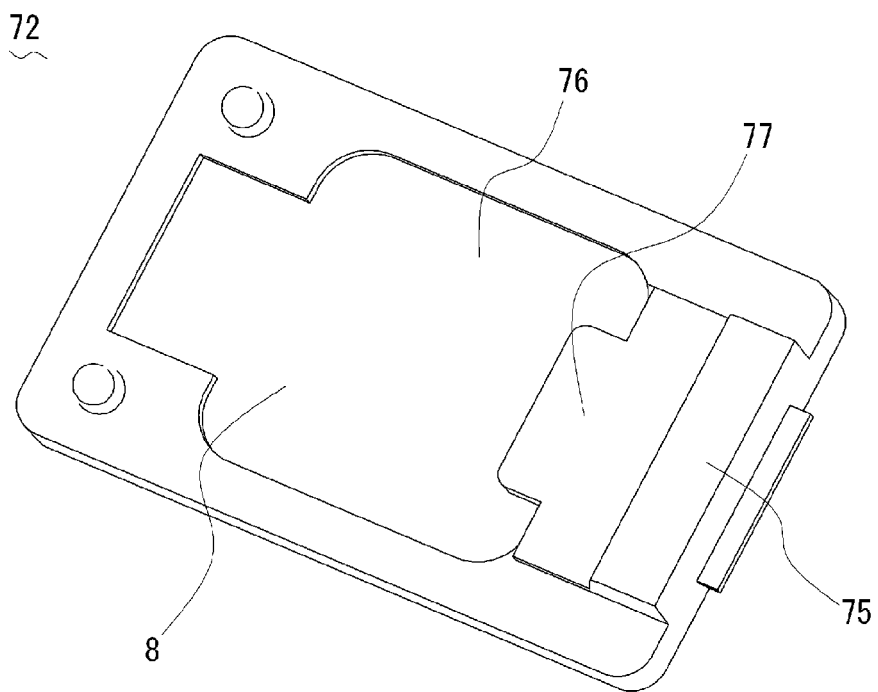
FIG. 6 is a perspective views showing a covering member.

FIG. 5 is a plan view of the breaker 1. In the same figure, the thermal actuator element 5 and the pressing part 77 are hatched with broken lines. In addition, FIG. 6 shows the reversed covering member 72. The opening 76 corresponding to the opening 73 of the resin base 71 is formed at the center part of the covering member 72, which prevents interference with the movable piece 4 during the reverse curving deformation. In addition, the pressing part 77 is formed adjacent to the opening 76. The pressing part 77 is formed, protruding into the inside of the opening 76. With this, as shown in FIG. 5, the pressing part 77 contains the region overlapping the thermal actuator element 5 in a planar view. In the embodiment, the pressing part 77 is configured to protrude farther into the inside of the opening 76 than the member with which the protrusion 44a and the thermal actuator element 5 contact. With the pressing part 77 extended and provided on the side of the movable contact 3 in this manner, the elastic portion 43 is energized downward, increasing contact pressure of the fixed contact 21 and the movable contact 3. In addition, if there is some room in an upper space of the stepped bent part 48, the pressing part 77 may extend out to a region containing the upper part of the stepped bent part 48.

As described above, according to the breaker 1 of the embodiment, since the bottom surface of the base end portion 42a of the elastic portion 43 is positioned lower than the top 5a of the upper surface of the thermal actuator element 5, the overall thickness of the resin casing 7 can be made thinner, while setting thickness of the part higher than the base end portion 42a of the elastic portion 43 similarly to the conventional breaker, which thus can achieve further reduction in thickness of the breaker 1.

In addition, since the movable piece 4 has the second stepped bent part 48, the bottom surface of the base end portion 42a of the elastic portion 43 can be easily positioned lower than the top 5a of the upper surface of the thermal actuator element 5, while avoiding interference of the thermal actuator element 5 and the movable piece 4, in the vicinity of the top 5a of the thermal actuator element 5. In the embodiment, in particular, since the second stepped bent part 48 is set up between the center part of the elastic portion 43 opposed to the vicinity of the top 5a of the upper surface of the thermal actuator element 5 and the protrusion 44a, the protrusion 44a can be easily positioned in the lower part. With this, the overall thickness of the resin casing 7 can be made thinner, while setting thickness of the upper part of the protrusion 44a similarly to the conventional breaker, which thus can achieve further reduction in thickness of the breaker 1.

In addition, the elastic portion 43 is biased downward by the pressing part 77 which is formed by protruding into the inside of the opening 73 to reach the region overlapping the thermal actuator element 5 in a planar view, thereby increasing the contact pressure of the fixed contact 21 and the movable contact 3. Thus, contact resistance therebetween is reduced and a resistance value in the conduction state can be stabilized. In addition, the vicinity of the base end portion 42a contacting with the protrusion 44a can be prevented from moving upward, when the thermal actuator element 5 is deformed. Thus, an amount of pressing up the protrusion 44b by the thermal actuator element 5 in the open circuit state, that is, a distance between the fixed contact 21 and the movable contact 3 can be increased, which enables currents to be shut off reliably.

In addition, since the movable piece 4 has the third stepped bent part 49, there is some room in the internal space in the vicinity of the tip section of the movable piece 4. Thus, in the open circuit state as shown in FIG. 3, the distance between the fixed contact 21 and the movable contact 3 can be increased, which enables currents to be shut off reliably.

Figure 7:
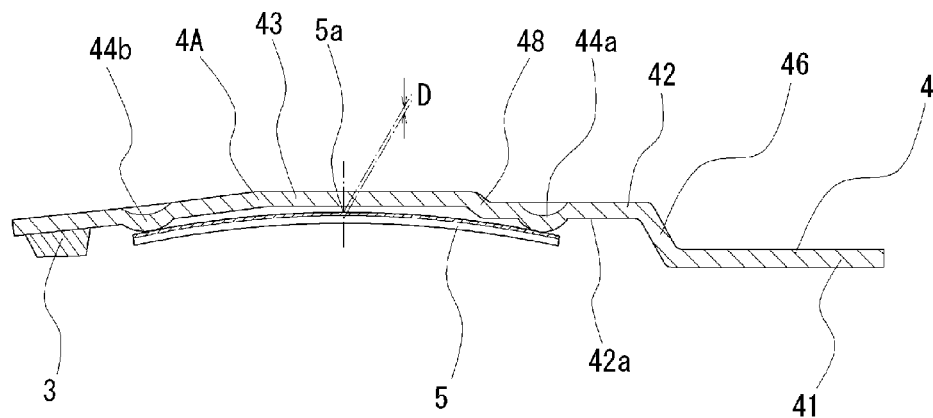
FIG. 7 is a cross sectional views showing a modified example of the movable piece.
Figure 7:
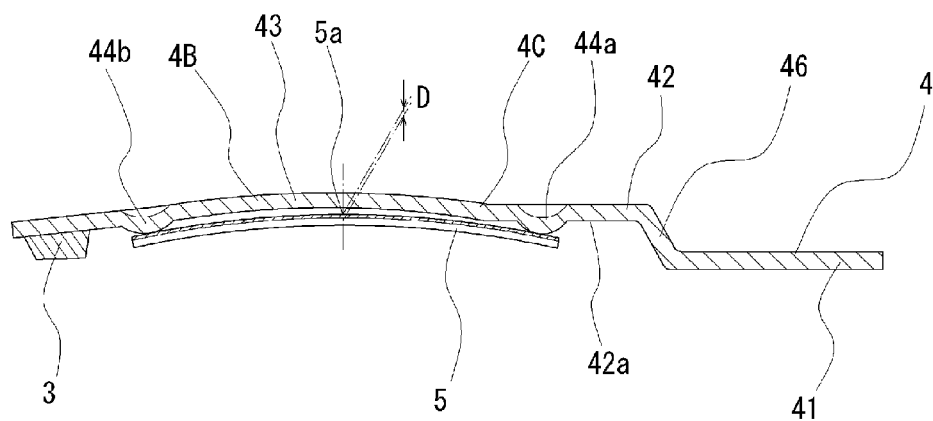
Figure 7:
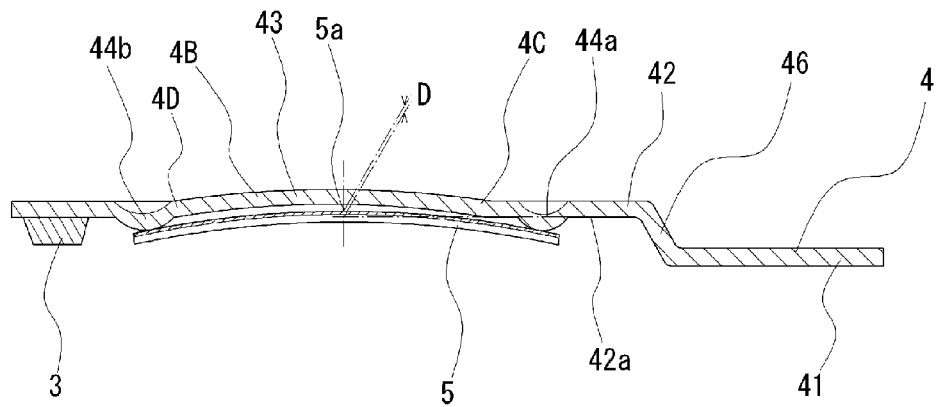

FIG. 7 shows a modified example of the movable piece 4. The movable piece 4 in FIG. 7(a) is in the mode having a bent part 4A which is made by the movable piece 4 causing the elastic portion 43 to bend, instead of the third stepped bent part 49. The bent part 4A is set up between the center part of the elastic portion 43 opposed to the vicinity of the top 5a of the upper surface of the thermal actuator element 5 and the tip section where the movable contact 3 is provided, arranging the tip section where the movable contact 3 is provided lower than the center part of the elastic portion 43. The bent part 4A may be in a loosely curved shape. The movable piece 4 in FIG. 7(b) is in the mode having a curved part 4B which is made by the movable piece 4 arcuately curving the elastic portion 43, instead of the second stepped bent part 48 and the third stepped bent part 49. In the curved part 4B, the edge 4C on the side of the protrusion 44a is bent or curved. The movable piece 4 in FIG. 7(c) is in the mode which has the curved part 4B which is made by the movable piece 4 causing the elastic portion 43 to arcuately curve and in which the edge 4c on the side of the protrusion 44a and the edge 4D on the side of the protrusion 44b are bent or curved. In any modified example, the bottom surface of the base end portion 42a of the elastic portion 43 is positioned lower than the top 5a of the upper surface of the thermal actuator element 5 by the distance D. In addition, the upper surface of the fixed part 42 is positioned lower than the topmost part of the elastic portion 43.

In addition, the present invention is not limited to the configuration of the embodiment described above, and it is acceptable if at least the bottom surface of the base end portion 42a of the movable piece 4 is positioned lower than the top 5a of the upper surface of the thermal actuator element 5. Specifically, it is acceptable if the root of the elastic portion 43 protruding from the edge of the arm support surface 74, when it is viewed from the inside of the opening 73, or the bottom surface of the fixed part 42 adjacent to this root is positioned lower than the top 5a of the upper surface of the thermal actuator element 5. Therefore, as far as such a positional relationship between the bottom surface of the base end portion 42a and the top 5a of the upper surface of the thermal actuator element 5 is fulfilled, it is also acceptable if the arm support surface 74 and the fixed part 42 are deformed so that a part of the upper surface of the arm support surface 74 or the bottom surface of the fixed part 42 is positioned higher than the top 5a of the upper surface of the thermal actuator element 5. In addition, the first stepped bent part 46 may be omitted and the movable piece 4 may be formed like a flat plane from the fixed part 42 to the terminal 41.

In addition, in the embodiment described above, although the pressing part 77 is continuously formed from the region opposed to the arm support surface 74 to the region overlapping the protrusion 44a in a planar view, the mode may be such that each region is separated from each other. In addition, in the embodiment described above, although the pressing part 77 is formed of the resin constituting the covering member 72, the pressing part 77 may be formed by deforming a part of the covering piece 8.

In addition, a through-hole may be formed on the fixed part 42 and a protrusion to be inserted into the through-hole may be provided on the arm support surface 74. In this case, positioning of the movable piece 4 is facilitated when the movable piece 4 is mounted in the resin base 71. In addition, the movable piece 4 can be firmly fixed to the resin base 71 and the covering member 72.

In addition, various modifications of the present invention are possible. For example, the resin casing 7 is not limited to the mode in which the resin casing 7 consists of the resin base 71 and the covering member 72, and the resin casing 7 may be in any other mode as far as the resin casing 7 consists of two components. In addition, while the embodiment has a self-holding circuit formed by the PTC thermistor 6, even the mode without such a configuration may be applicable and can reduce the breaker 1 in size, while ensuring stable operation.

In addition, the present invention may be applied to the mode in which the movable piece 4 is structurally separated on the side of the terminal 41 and on the side of the movable contact 3 in the fixed part 42 or in its vicinity, as shown in Japanese Patent Application Publication No. 2005-203277. In this case, each separated piece is pressed by the resin base 71 and the covering member 72 to be electrically connected. A configuration may be such that each separated piece is joined by means of welding or crimping and the like.

In addition, in the present invention, the second stepped bent part 48, the third stepped bent part 49, the bent part 4A, the curved part 48 and the like being formed on the movable piece 4, and thus the elastic portion 43 slightly protrudes upward (to the side opposite to the thermal actuator element 5) in the vicinity of the top 5a of the thermal actuator element 5. Then, a concave portion for preventing interference with the elastic portion 43 may be formed on the bottom surface of the covering piece 8 by means of bending or coining and the like on the covering piece 8. In addition, a configuration may be such that the movable piece 4 makes contacts with the covering piece 8 in the fixed part 42 and/or in the vicinity thereof. In this case, a part of the covering piece 8 may be used as a terminal by being exposed from the covering member 72 to the outside of the breaker 1, instead of the terminal 41. The mode of using the part of the covering piece 8 as the terminal may be such that a terminal part thereof protrudes from the side face of the resin casing 7 or a part of covering piece 8 exposed to the upper surface of the resin casing 7 from which resin is eliminated functions as a terminal, for example. With the modes as described above, thickness dimensions of the covering member 72 can be reduced, thereby enabling further miniaturization of the breaker 1.

Figure 8:
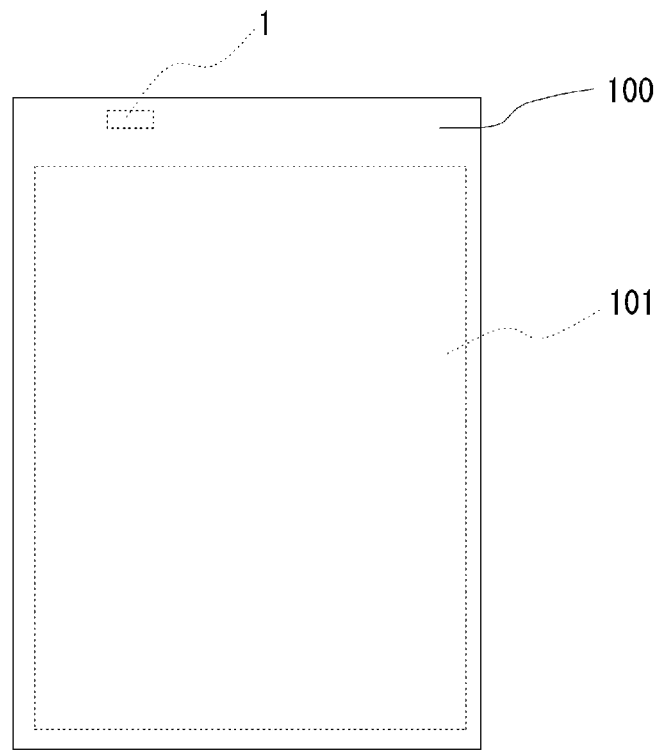
FIG. 8 is a plan view showing a structure of a secondary battery pack equipped with the breaker.
Figure 9:
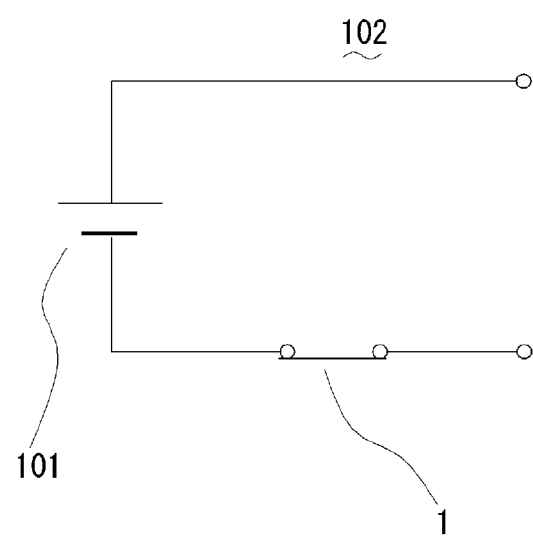
FIG. 9 is a circuit diagram of a safety circuit equipped with the breaker.

In addition, the breaker 1 of the present invention can be widely applied to a secondary battery pack, a safety circuit for electrical equipment and the like. FIG. 8 shows a secondary battery pack 100. The secondary battery pack 100 includes a secondary battery 101 and the breaker 1 provided in an output circuit of the secondary battery 101. FIG. 9 shows a safety circuit 102 for electrical equipment. The safety circuit 102 includes the breaker 1 in series in the output circuit of the secondary battery 101.

As set forth above, the present invention may include a breaker comprising a fixed piece having a fixed contact, a movable piece having an elastically deformable elastic portion and a movable contact in a tip section of the elastic portion, for pressing the movable contact to the fixed contact so as to contact therewith, a thermal actuator element for actuating the movable piece so that the movable contact is separated from the fixed contact by its deformation accompanying a temperature change, and a casing for housing the fixed piece, the movable piece and the thermal actuator element. In this breaker, a bottom surface of a base end portion of the movable piece may be positioned lower than a top of an upper surface of the thermal actuator element with the fixed contact being in contact with the movable contact.

With this breaker, since the bottom surface of the base end portion of the elastic portion is positioned lower than the top of the upper surface of the thermal actuator element, the overall thickness of casing can be made thinner, while setting thickness of the part higher than the base end portion of the elastic portion similar to the conventional breaker, which thus can achieve further reduction in thickness of the breaker.

In this breaker, the movable piece may have a stepped bent part for arranging the elastic portion in the vicinity of the top of the upper surface of the thermal actuator element and the base end portion in a staggered manner.

With this breaker, the bottom surface of the base end portion of the elastic portion can be easily positioned lower than the top of the upper surface of the thermal actuator element, while avoiding interference of the thermal actuator element and the movable piece, at the top of the thermal actuator element.

In this breaker, the casing may have a pressing part for contacting with the upper surface of the base end portion and pressing down the movable piece, and the pressing part may be formed to contain a region overlapping the thermal actuator element in a planar view.

With this breaker, the pressing part energizing the elastic portion downward, contact pressure of the fixed contact and the movable contact can be increased and contact resistance therebetween can be reduced, and a resistance value in the conduction state can be stabilized.

In this breaker, the movable piece may have a bent part which is bent or curved from the elastic portion in the vicinity of the top of the upper surface of the thermal actuator element to the tip section.

With the breaker, since there is some room in the internal space in the vicinity of the tip section of the movable piece, the distance between the fixed contact and the movable contact in the open circuit state can be increased, which enables currents to be shut off reliably.

Further, the present invention is a safety circuit for an electric machine characterized by the provision of the breaker.

Furthermore, the present invention is a secondary battery characterized by the provision of the breaker.

The safety circuit or the secondary battery pack enables miniaturization of the safety circuit or the secondary battery pack, while ensuring safety of the electrical equipment by reliably shutting down currents in the open circuit state.

EXPLANATION OF MARKS 1 breaker
2 fixed piece
3 movable contact 4 movable piece
5 thermal actuator element
7 resin casing
21 fixed contact
42 fixed part
42a base end portion
43 elastic portion
48 second stepped bent part (stepped bent part)
49 third stepped bent part (bent part)
4A bent part
71 resin base (casing)
72 covering member (casing)
77 pressing part
101 secondary battery
102 safety circuit

The invention claimed is:

1. A breaker comprising
a fixed piece having a fixed contact,
a movable piece having:
an elastically deformable elastic portion;
a base end portion; and
a movable contact in a tip section of the elastic portion, opposite to the base end portion, for pressing the movable contact to the fixed contact so as to contact therewith,
a thermal actuator element for actuating the movable piece so that the movable contact is separated from the fixed contact by a deformation of the movable piece accompanying a temperature change, the thermal actuator element having a bottom surface facing the fixed piece, and an upper surface opposite to the bottom surface, and
a casing for housing the fixed piece, the movable piece and the thermal actuator element,
a first direction being defined as a direction from the fixed contact to the movable contact;
a second direction being defined as a direction opposite to the first direction,
wherein:
a bottom surface, facing the fixed piece, of the base end portion of the movable piece is positioned closer to the fixed piece, along the second direction, than an apex of the upper surface of the thermal actuator element while the fixed contact is in contact with the movable contact, and
the movable piece further includes:
a stepped bent part configured to arrange the elastic portion, in a vicinity of the apex of the upper surface of the thermal actuator element, and the base end portion in a staggered manner when the movable contact contacts the fixed contact; and
a protrusion opposed to the thermal actuator element so as to make contact with the thermal actuator element when the movable contact separates from the fixed contact,
wherein the stepped bent part is arranged between a center part of the elastic portion opposed to the vicinity of the apex of the upper surface of the thermal actuator element, and the protrusion.

2. The breaker in accordance with claim 1, wherein:
the casing has a first casing for housing the fixed piece, the movable piece and the thermal actuator element, and a second casing mounted on a surface of the first casing in the first direction,
the second casing has a pressing part for contacting with an upper surface, opposite to the bottom surface, of the base end portion and pressing the movable piece in the second direction, and
the pressing part is formed to contain a region overlapping the thermal actuator element in a planar view.

3. The breaker in accordance with claim 1, wherein the movable piece has a bent part which is bent or curved from the elastic portion in the vicinity of the apex of the upper surface of the thermal actuator element to the tip section.

4. A safety circuit for an electrical equipments comprising the breaker as set forth in claim 1.

5. A secondary battery pack comprising the breaker as set forth in claim 1.

6. The breaker in accordance with claim 2, wherein the movable piece has a bent part which is bent or curved from the elastic portion in the vicinity of the apex of the upper surface of the thermal actuator element to the tip section.

* * * * *